United States Patent
Tsukamoto et al.

(10) Patent No.: US 11,496,006 B2
(45) Date of Patent: Nov. 8, 2022

(54) STATOR, MOTOR, COMPRESSOR, AIR CONDITIONING APPARATUS, AND METHOD FOR MANUFACTURING STATOR

(71) Applicant: Mitsubishi Electric Corporation, Tokyo (JP)

(72) Inventors: Emi Tsukamoto, Tokyo (JP); Koji Yabe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 337 days.

(21) Appl. No.: 16/651,078

(22) PCT Filed: Oct. 10, 2017

(86) PCT No.: PCT/JP2017/036605
§ 371 (c)(1),
(2) Date: Mar. 26, 2020

(87) PCT Pub. No.: WO2019/073509
PCT Pub. Date: Apr. 18, 2019

(65) Prior Publication Data
US 2020/0266676 A1 Aug. 20, 2020

(51) Int. Cl.
*H02K 3/12* (2006.01)
*H02K 1/12* (2006.01)
(Continued)

(52) U.S. Cl.
CPC ............... *H02K 1/165* (2013.01); *H02K 3/12* (2013.01); *H02K 3/30* (2013.01); *H02K 3/345* (2013.01); *H02K 15/024* (2013.01); *H02K 15/105* (2013.01); *F25B 31/026* (2013.01); *F25B 2500/08* (2013.01); *H02K 15/12* (2013.01); *H02K 2213/03* (2013.01)

(58) Field of Classification Search
CPC .. H02K 3/00; H02K 3/04; H02K 3/12; H02K 2213/03; H02K 1/16; H02K 1/165; H02K 15/024; F25B 31/026; F25B 2500/08
See application file for complete search history.

(56) References Cited

U.S. PATENT DOCUMENTS 4,780,635 A * 10/1988 Neumann ............ H02K 17/165
                                                        310/179
6,281,612 B1 * 8/2001 Asao .................... H02K 15/045
                                                        310/179
(Continued)

FOREIGN PATENT DOCUMENTS

JP   H06-038422 A   2/1994
JP   2002-051491 A  2/2002
(Continued)

OTHER PUBLICATIONS

Chinese Office Action dated Sep. 1, 2021, issued in corresponding Chinese Patent Application No. 201780095171.9 (and English Machine Translation).
(Continued)

*Primary Examiner* — Burton S Mullins
(74) *Attorney, Agent, or Firm* — Posz Law Group, PLC

(57) ABSTRACT

A slot includes a coil housing portion having first and second side portions and a bottom portion. A first straight line connects first and second points which are boundaries between the bottom portion and the side portions. A slot opening has third and fourth points closest to the first and second side portions. A second straight line connects the first and third points. A third straight line connects the second and fourth points. A first region is surrounded by the first straight line and the bottom portion. A second region is surrounded by the second straight line and the first side portion, and is surrounded by the third straight line and the second side portion. A third region is surrounded by the three straight (Continued)

lines. Areas A1, A2 and A3 of the three regions and total cross-sectional areas S1, S2, S3 of coils therein satisfy (S1/A1)>(S2/A2)>(S3/A3).

18 Claims, 14 Drawing Sheets

(51) Int. Cl.
  *H02K 3/30* (2006.01)
  *H02K 1/16* (2006.01)
  *H02K 3/34* (2006.01)
  *H02K 15/02* (2006.01)
  *H02K 15/10* (2006.01)
  *F25B 31/02* (2006.01)
  *H02K 15/12* (2006.01)

(56) References Cited

U.S. PATENT DOCUMENTS

| | | | |
|---|---|---|---|
| 9,472,987 B1 * | 10/2016 | Hall | H02K 3/12 |
| 9,634,533 B2 | 4/2017 | Uchitani | |
| 2016/0036277 A1 * | 2/2016 | Lynch | H02K 15/085 |
| | | | 264/104 |
| 2016/0344243 A1 | 11/2016 | Yoshitake et al. | |
| 2018/0109155 A1 * | 4/2018 | Munoz | H02K 3/30 |

FOREIGN PATENT DOCUMENTS

| | | |
|---|---|---|
| JP | 2003-235194 A | 8/2003 |
| JP | 2006-205373 A | 8/2006 |
| JP | 2015-006034 A | 1/2015 |
| JP | 2016-220359 A | 12/2016 |

OTHER PUBLICATIONS

Japanese Office Action dated Feb. 16, 2021, issued in corresponding JP Patent Application No. 2019-547808 (and English Machine Translation).

International Search Report of the International Searching Authority dated Dec. 26, 2017 for the corresponding international application No. PCT/JP2017/036605 (and English translation).

Indian Office Action dated Mar. 10, 2021, issued in corresponding Indian Patent Application No. 202027014617 (and English Machine Translation).

* cited by examiner

STATOR, MOTOR, COMPRESSOR, AIR CONDITIONING APPARATUS, AND METHOD FOR MANUFACTURING STATOR

CROSS REFERENCE TO RELATED APPLICATION

This application is a U.S. national stage application of International Patent Application No. PCT/JP2017/036605 filed on Oct. 10, 2017, the disclosure of which is incorporated herein by reference.

TECHNICAL FIELD

The present invention relates to a stator, a motor, a compressor, an air conditioning apparatus, and a method for manufacturing the stator.

BACKGROUND

In recent years, motors are required to achieve higher outputs. With an increase in output of the motors, currents flowing through coils also increase. Thus, enhancement in heat dissipation properties for dissipating heat generated by the coils is an issue.

In, for example, a motor used for a compressor, most part of coils of a stator is in contact with refrigerant and lubricant in the compressor, and thus heat is dissipated from the coils through a stator core. It is, therefore, necessary to efficiently conduct heat from the coils to the stator core.

In view of this, there is proposed a stator in which coils are wound on a stator core via insulators, and a mold portion made of a sealant is formed to cover the stator core and the coils (see, for example, patent reference 1).

PATENT REFERENCE

Patent Reference 1: Japanese Patent Application Publication No. 2002-51491 (see paragraphs 0029 to 0037)

In the conventional motor, however, heat is not sufficiently conducted between the individual coils and between the coils and the stator core. Thus, satisfactory heat dissipation effect can be obtained, and a rise in temperature of the coils cannot be satisfactorily inhibited.

SUMMARY

The present invention is made to solve the above-described problem, and an object of the present invention is to enhance dissipation properties for dissipating heat generated by coils of a stator to inhibit a rise in temperature of the coils.

A stator according to the present invention includes a stator core having an inner circumference extending in a circumferential direction about an axis, and a slot located outside the inner circumference in a radial direction about the axis, coils disposed in the slot, and a resin portion surrounding the coils in the slot. The slot includes an opening connecting to the inner circumference, and a coil housing portion formed outside the opening in the radial direction and housing the coils. The coil housing portion includes a first side portion and a second side portion facing each other in the circumferential direction, and a bottom portion having a curved shape and located outside the first side portion and the second side portion in the radial direction. In a plane perpendicular to the axis, a boundary between the bottom portion and the first side portion is defined as a first point, and a boundary between the bottom portion and the second side portion is defined as a second point. A point on the opening closest to the first side portion is defined as a third point, and a point on the opening closest to the second side portion is defined as a fourth point. A straight line connecting the first point to the second point is defined as a first straight line, a straight line connecting the first point to the third point is defined as a second straight line, and a straight line connecting the second point to the fourth point is defined as a third straight line. A region surrounded by the first straight line and the bottom portion is defined as a first region. A combination of a region surrounded by the second straight line and the first side portion, and a region surrounded by the third straight line and the second side portion is defined as a second region. A region surrounded by the first straight line, the second straight line, and the third straight line in the coil housing portion is defined as a third region. An area A1 of the first region, a total cross-sectional area S1 of the coils in the first region, an area A2 of the second region, a total cross-sectional area S2 of the coils in the second region, an area A3 of the third region, and a total cross-sectional area S3 of the coils in the third region satisfy (S1/A1)>(S2/A2)>(S3/A3).

According to the present invention, the coils are most densely arranged in the first region close to the outer circumference of the stator core, and the coils are second most densely arranged in the second region on both sides of the slot in the circumferential direction. This makes it possible to efficiently conduct heat generated by the coils to the stator core, and to enhance heat dissipation properties. It is, therefore, possible to inhibit the rise in temperature of the coils.

DETAILED DESCRIPTION

Embodiment 1

Figure 1:
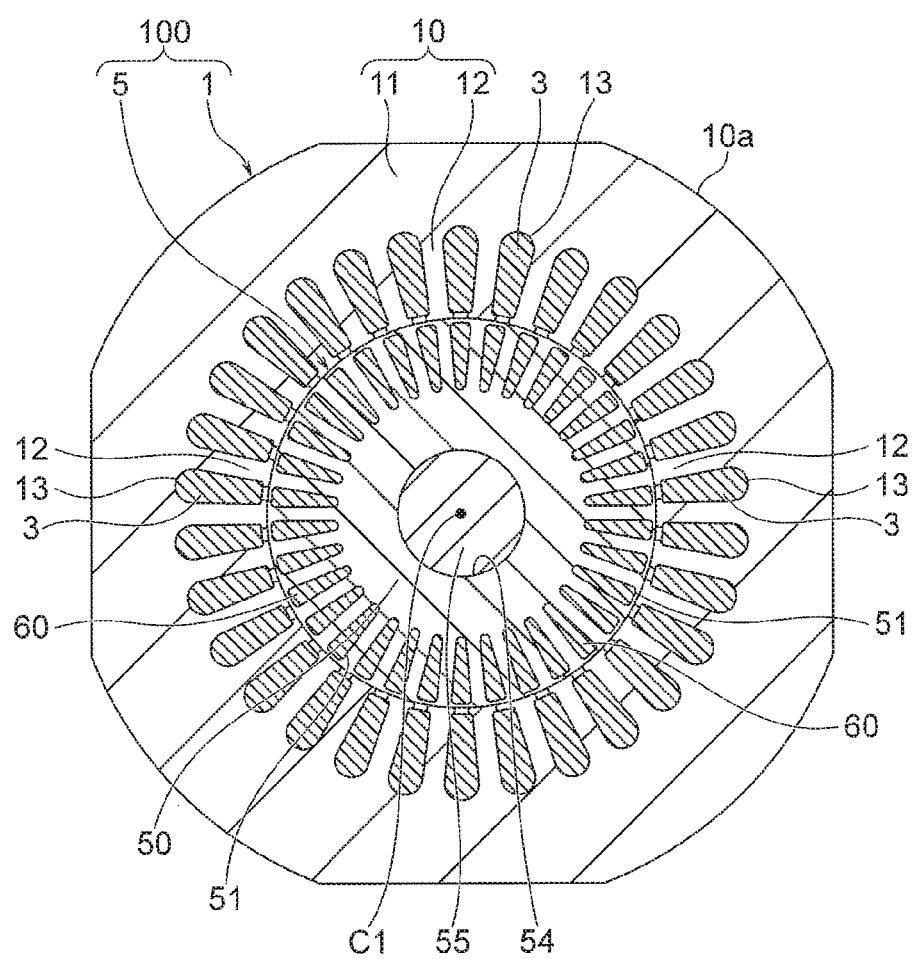
FIG. 1 is a sectional view illustrating a motor according to Embodiment 1.

FIG. 1 is a sectional view illustrating a motor 100 according to Embodiment 1. The motor 100 illustrated in FIG. 1 is implemented as an induction motor, and used in, for example, a compressor of an air conditioning apparatus. The motor 100 includes a stator 1, and a rotor 5 rotatably provided inside the stator 1. An air gap is formed between the stator 1 and the rotor 5.

A direction of an axis C1 serving as a rotation axis of the rotor 5 will be referred to as the "axial direction" hereinafter. A circumferential direction about the axis C1 will be referred to as the "circumferential direction" hereinafter, and a radial direction about the axis C1 will be referred to as the "radial direction" hereinafter.

(Configuration of Rotor 5)

Figure 2A:
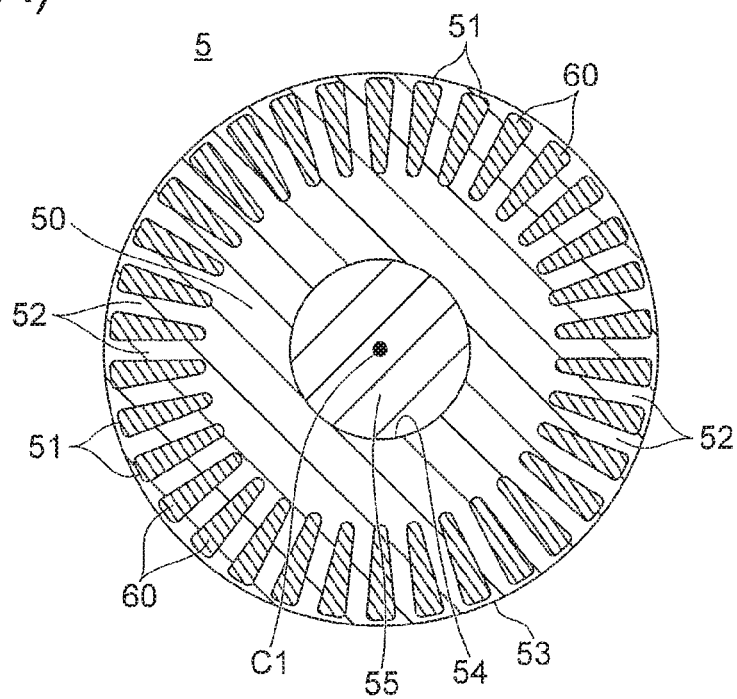
FIGS. 2(A) and 2(B) are a sectional view and a perspective view illustrating a rotor according to Embodiment 1.
Figure 2B:
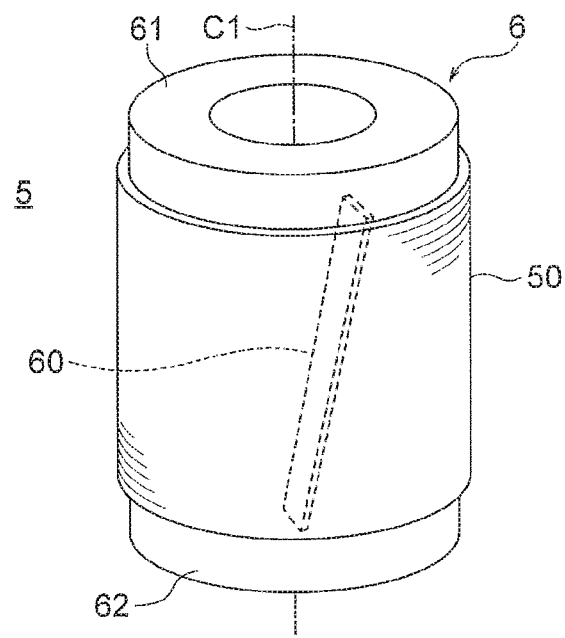

FIGS. 2(A) and 2(B) are a sectional view and a perspective view illustrating the rotor 5. The rotor 5 includes a rotor core 50 including a plurality of slots 51, a shaft 55 serving as a rotating shaft, and bars 60 inserted into the slots 51 of the rotor core 50, as illustrated in FIG. 2(A).

The rotor core 50 is made of, for example, electrical steel sheets each having a thickness of 0.1 to 0.7 mm stacked in the axial direction and fastened together by crimping or the like. A circular shaft hole 54 is formed at a center of the rotor core 50 in the radial direction. The shaft 55 is fixed to the shaft hole 54 by press fitting. The axis C1 of the shaft 55 defines the rotation axis of the rotor 5.

The rotor core 50 is formed in an annular shape about the axis C1. The plurality of slots 51 (also referred to as rotor slots) are formed at equal intervals in the circumferential direction along an outer circumference 53 of the rotor core 50. The number of slots 51 is 34 in this example, but is not limited thereto. The slots 51 are grooves extending in the radial direction, and run through the rotor core 50 in the axial direction. Teeth 52 (also referred to as rotor teeth) are formed each between the slots 51 adjacent to each other in the circumferential direction.

The rotor 5 includes a pair of end rings 61 and 62 at both ends of the rotor core 50 in the axial direction, as illustrated in FIG. 2(B). The end rings 61 and 62 are connected to both ends of each bar 60 in the axial direction, and are formed integrally with the bars 60. The bars 60 and the end rings 61 and 62 constitute a squirrel-cage secondary conductor 6.

The squirrel-cage secondary conductor 6 is made of a nonmagnetic conductive material such as aluminum. The end rings 61 and 62 and the bars 60 of the squirrel-cage secondary conductor 6 are formed by casting aluminum into the slots 51 and on both ends of the rotor core 50. In this regard, copper may be used in place of aluminum.

Each bar 60 extends with an inclination so that one end in the longitudinal direction is displaced in the circumferential direction relative to the other end in the longitudinal direction. In FIG. 2(B), only one bar 60 is shown by a broken line. When magnetic flux from the stator 1 links with the bar 60 of the rotor 5, secondary current is generated in the bar 60. The secondary current and the magnetic flux from the stator 1 produce a torque for rotating the rotor 5.

(Configuration of Stator 1)

Figure 3:
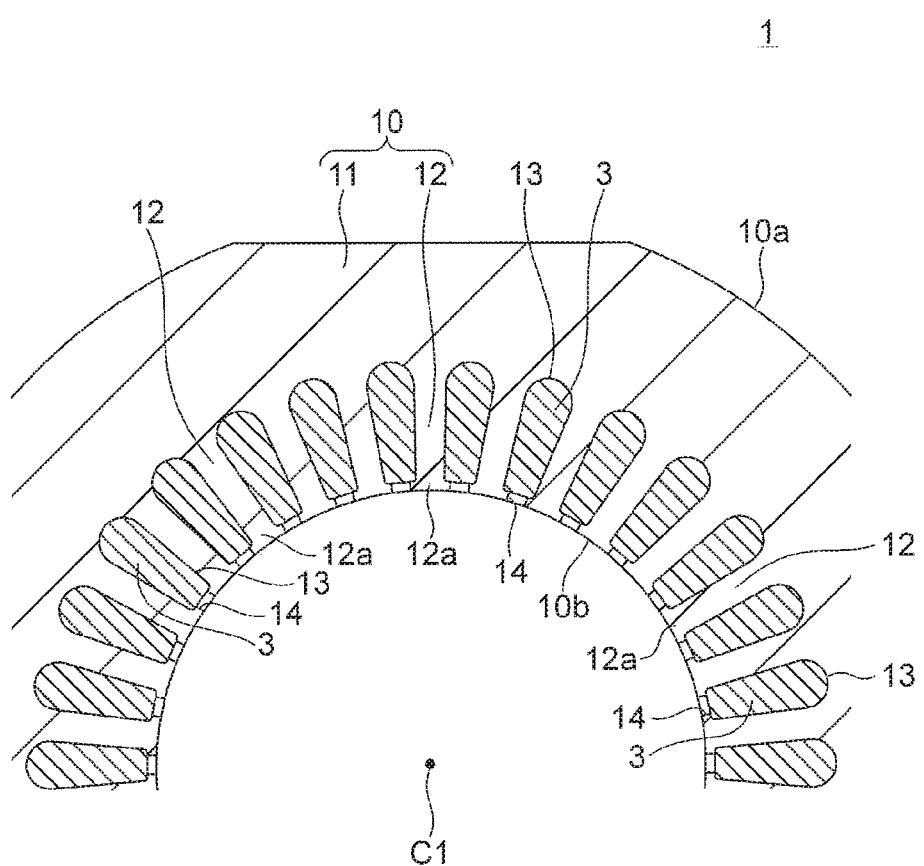
FIG. 3 is an enlarged sectional view illustrating a stator according to Embodiment 1.

FIG. 3 is an enlarged sectional view illustrating a part of the stator 1. The stator 1 includes a stator core 10, and coils 3 wound on the stator core 10. The stator core 10 is made of, for example, electrical steel sheets each having a thickness of 0.1 to 0.7 mm stacked in the axial direction and fastened together by crimping or the like.

The stator core 10 includes an inner circumference 10b extending in the circumferential direction about the axis C1, and an outer circumference 10a located outside the inner circumference 10b in the radial direction. The stator core 10 has a plurality of slots 13 that open on the inner circumference 10b, and the slots 13 are formed at equal intervals in the circumferential direction. The coils 3 are housed in the slots 13. The number of slots 13 is 30 in this example, but is not limited thereto.

The stator core 10 further includes an annular yoke 11, and a plurality of teeth 12 projecting inward in the radial direction from the yoke 11. The teeth 12 are arranged at equal intervals in the circumferential direction. The slots 13 are formed each between the teeth 12 adjacent to each other in the circumferential direction. The number of teeth 12 is equal to the number of slots 13 (in this example, 30). The coils 3 are wound around the teeth 12.

Each tooth 12 includes a tooth end 12a formed at its inner end in the radial direction (that is, its end on the axis C1 side), and the tooth end 12a has a width (dimension in the circumferential direction) wider than the other parts of the tooth 12. Tips of the tooth ends 12a have arc shapes, and form the inner circumference 10b of the stator core 10.

Figure 4:
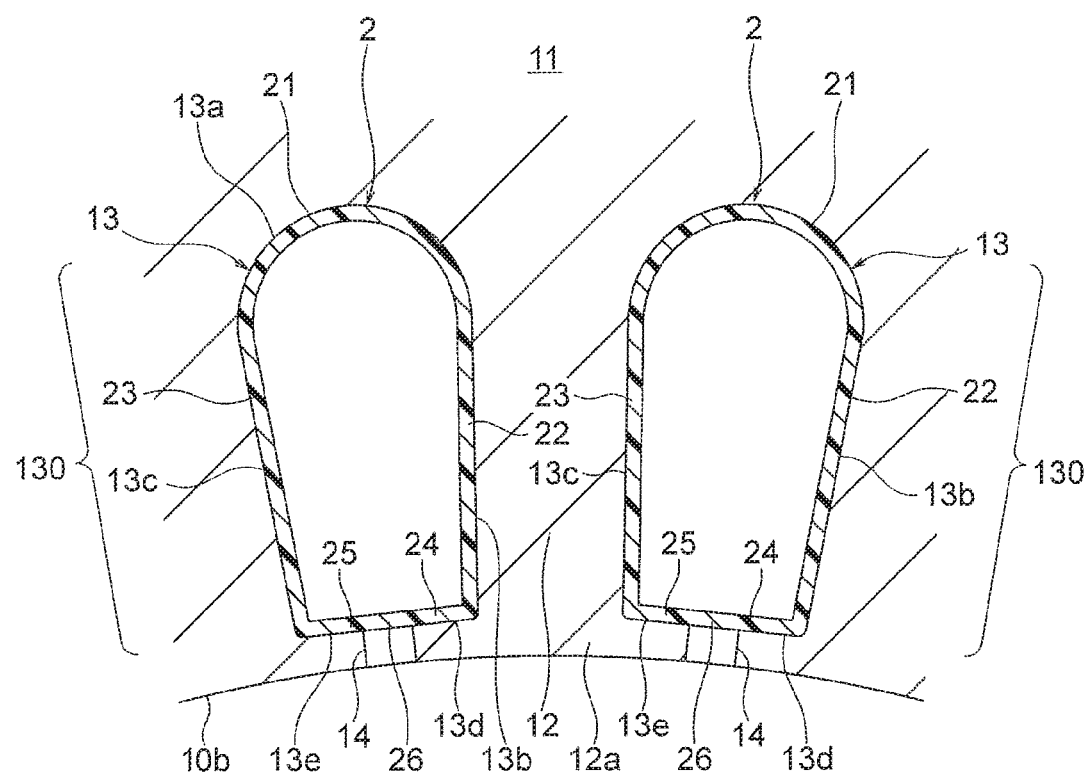
FIG. 4 is an enlarged sectional view illustrating a portion including slots of the stator according to Embodiment 1.

FIG. 4 is an enlarged view illustrating a portion including the slots 13 of the stator 1, where the coils 3 and resin portions (FIG. 5) are omitted. Each slot 13 includes an opening 14 connecting to the inner circumference 10b of the stator core 10, and a first side portion 13b and a second side portion 13c located outside the opening 14 in the radial direction. The first side portion 13b and the second side portion 13c face each other in the circumferential direction. Each slot 13 further includes a bottom portion 13a having a curved shape and located outside the side portions 13b and 13c in the radial direction.

The opening 14 is formed between the tooth ends 12a adjacent to each other in the circumferential direction. In this example, the width (that is, the dimension in the circumferential direction) of the opening 14 is uniform throughout the radial direction. The opening 14 is filled with no resin and therefore forms a hollow portion. The openings 14 serve as inlets to allow the coils 3 to pass when the coils 3 are wound around the teeth 12.

The bottom portion 13a has a curved shape (more specifically, an arc shape) such that its center in the circumferential direction protrudes outward in the radial direction relative to its both ends in the circumferential direction. The side portions 13b and 13c extend so that a distance between the side portions 13b and 13c in the circumferential direction increases outward in the radial direction.

A first facing portion 13d extending in the circumferential direction is formed between the opening 14 and an inner end (that is, an end closer to the inner circumference 10b) of the first side portion 13b in the radial direction. Similarly, a second facing portion 13e extending in the circumferential direction is formed between the opening 14 and an inner end of the second side portion 13c in the radial direction. The facing portions 13d and 13e face the bottom portion 13a.

In each slot 13, a region surrounded by the bottom portion 13a, the side portions 13b and 13c, and the facing portions 13d and 13e forms a coil housing portion 130 housing the coils 3. The slot 13 includes the coil housing portion 130 and the opening 14.

A slot insulating portion 2 is formed on an inner surface of the coil housing portion 130 (that is, inner surfaces of the bottom portion 13a, the first side portion 13b, the second side portion 13c, the first facing portion 13d, and the second facing portion 13e) of each slot 13. The slot insulating portion 2 is made of a resin such as polyethylene terephthalate (PET). The slot insulating portion 2 electrically insulates the stator core 10 and the coils 3 in the slot 13 from each other.

The slot insulating portion 2 includes a first portion 21 covering the bottom portion 13a, a second portion 22 covering the first side portion 13b, a third portion 23 covering the second side portion 13c, a fourth portion 24 covering the first facing portion 13d, and a fifth portion 25 covering the second facing portion 13e.

An opening insulating portion 26 is provided between the opening 14 and the coil housing portion 130 of the slot 13. The opening insulating portion 26 is formed of a resin such as PET, and has a film shape. The opening insulating portion 26 is disposed between the fourth portion 24 and the fifth portion 25 of the slot insulating portion 2. The opening insulating portion 26 prevents the coils 3 from falling off the slot 13.

Figure 5:
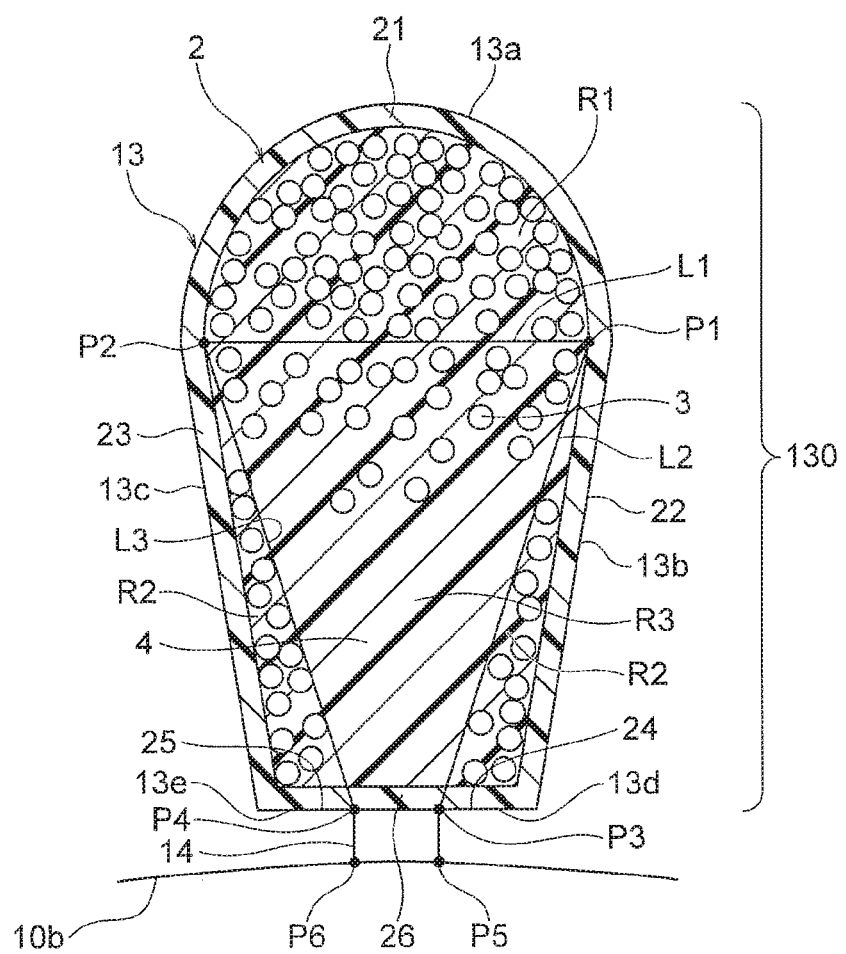
FIG. 5 is an enlarged sectional view illustrating a portion including a slot of the stator according to Embodiment 1.

FIG. 5 is an enlarged view illustrating a portion including the slot 13 of the stator 1. The coils 3 wound around the teeth 12 are disposed in the coil housing portion 130 of the slot 13 covered with the slot insulating portion 2. The coil 3 is made of, for example, copper and has a wire diameter of 0.8 to 1.0 mm.

Each slot 13 is filled with a resin portion 4 (first resin portion) having high thermal conductivity to surround the coils 3 in the slot 13. The resin portion 4 is formed of, for example, polybutylene terephthalate (PBT), but is not limited thereto. The resin portion 4 desirably has a thermal conductivity higher than that of the slot insulating portion 2, as will be described later.

(Arrangement of Coils 3 in Slot 13)

The arrangement of the coils 3 in the slot 13 will be described below. In this example, an interior of the slot 13 is divided into three regions R1, R2, and R3. The regions R1, R2, and R3 are defined based on points P1, P2, P3, and P4 and straight lines L1, L2, and L3. These will be described in sequence below.

A boundary between the bottom portion 13a and the first side portion 13b of the slot 13 is defined as a first point P1. A boundary between the bottom portion 13a and the second side portion 13c of the slot 13 is defined as a second point P2. The points P1 and P2 correspond to both ends of the bottom portion 13a of the slot 13 in the circumferential direction.

Since the slot insulating portion 2 is provided in the slot 13, more specifically, the first point P1 correspond to a point on the inner surface of the slot insulating portion 2 located at the boundary between the bottom portion 13a and the first side portion 13b of the slot 13 (that is, a boundary between the first portion 21 and the second portion 22). The second point P2 corresponds to a point on the inner surface of the slot insulating portion 2 located at the boundary between the bottom portion 13a and the second side portion 13c of the slot 13 (that is, a boundary between the first portion 21 and the third portion 23).

In the opening 14, a point closest to the first point P1 is defined as a third point P3. In the opening 14, a point closest to the second point P2 is defined as a fourth point P4. In other words, the opening 14 has two ends in the circumferential direction at an outer edge (that is, a portion connecting to the coil housing portion 130) in the radial direction. Of the two ends, the end on the same side as the point P1 corresponds to the point P3, and the end on the same side as the point P2 corresponds to the point P4.

The opening 14 has the two ends in the circumferential direction at an inner edge (that is, a portion connecting to the inner circumference 10b of the stator core 10) in the radial direction. Of the two ends, the end on the same side as the point P3 is defined as a point P5, and the end on the same side as the point P4 is defined as a point P6.

A straight line connecting the first point P1 to the second point P2 is defined as a first straight line L1. A straight line connecting the first point P1 to the third point P3 is defined as a second straight line L2. A straight line connecting the second point P2 to the fourth point P4 is defined as a third straight line L3.

A region surrounded by the first straight line L1 and the bottom portion 13a is defined as a first region R1. A combination of a triangular region surrounded by the second straight line L2 and the first side portion 13b, and a triangular region surrounded by the third straight line L3 and the second side portion 13c is defined as a second region R2. A region located outside the opening 14 and surrounded by the first straight line L1, the second straight line L2, and the third straight line L3 is defined as a third region R3.

Since the slot insulating portion 2 is provided in the slot 13, more specifically, the first region R1 corresponds to a region surrounded by the first straight line L1 and the inner surface of the slot insulating portion 2 (first portion 21) on the bottom portion 13a. The second region R2 corresponds to a combination of a triangular region surrounded by the second straight line L2 and the inner surface of the slot insulating portion 2 (second portion 22) on the first side portion 13b, and a triangular region surrounded by the third straight line L3 and the inner surface of the slot insulating portion 2 (third portion 23) on the second side portion 13c.

A total cross-sectional area of the coils 3 disposed in the first region R1 is defined as S1, a total cross-sectional area of the coils 3 disposed in the second region R2 is defined as S2, and a total cross-sectional area of the coils 3 disposed in the third region R3 is defined as S3. The total cross-sectional area of the coils 3 means the sum of the cross-sectional areas of the coils 3 disposed in a certain region, and is equal to a value obtained by multiplying the cross-sectional area of one coil 3 by the number of coils 3 disposed in the region.

The area A1 of the first region R1, the total cross-sectional area S1 of the coils 3 in the first region R1, the area A2 of the second region R2, the total cross-sectional area S2 of the coils 3 in the second region R2, the area A3 of the third region R3, and the total cross-sectional area S3 of the coils 3 in the third region R3 satisfy:

$$(S1/A1) > (S2/A2) > (S3/A3).$$

This means that an area ratio of the coils 3 in the slot 13 (that is, a ratio of the total cross-sectional area of the coils to the area of the region) is highest in the first region R1, second highest in the second region R2, and lowest in the third region R3.

Figure 6:
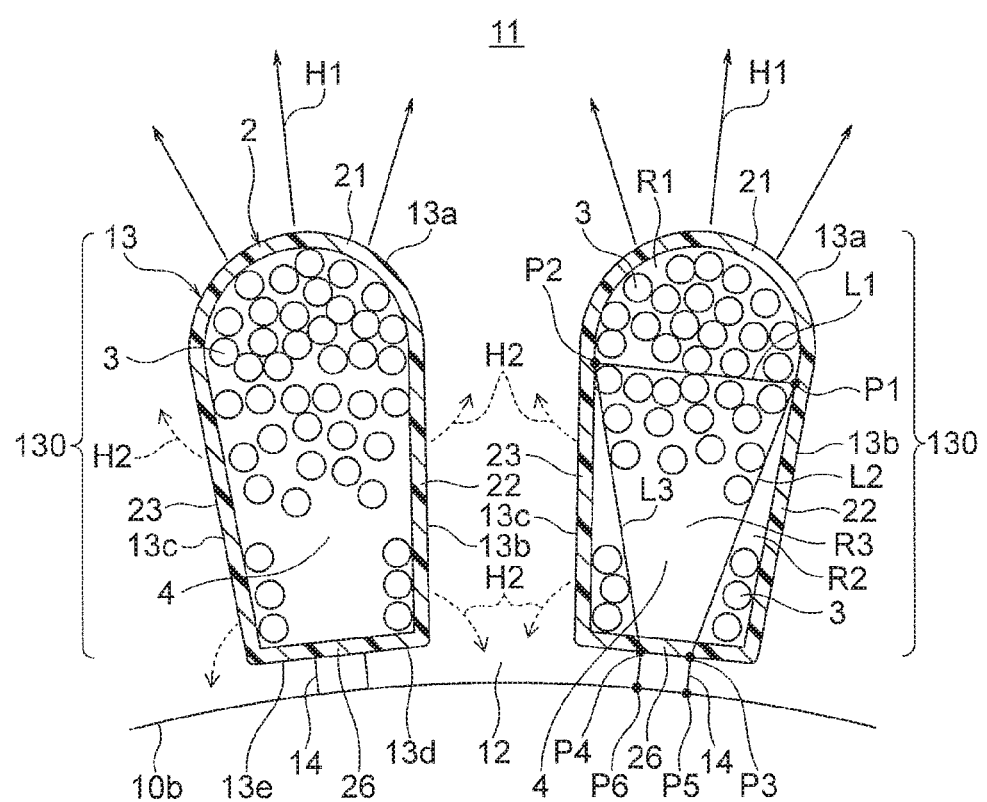
FIG. 6 is a schematic view depicting an action of heat dissipation from the slots of the stator according to Embodiment 1.

FIG. 6 is a schematic view depicting the action of heat dissipation from the slots 13 in the stator 1. Heat generated by the coils 3 in each slot 13 is dissipated through heat dissipation paths (indicated by arrows H1) from the slot 13 toward the yoke 11 located outside in the radial direction, and heat dissipation paths (indicated by arrows H2) from the slot 13 toward the teeth 12 adjacent thereto in the circumferential direction.

Among these heat dissipation paths, the tooth 12 has a small area and receives heat conducted from the slots 13 on both sides, and therefore heat is likely to be stored in the tooth 12. In contrast, the yoke 11 has a large area, and the outer circumference 10a (FIG. 1) is in contact with a closed container or the like (to be described later) of a compressor, and therefore heat is likely to be dissipated outside the stator 1.

Hence, the area ratio of the coils 3 is set highest in the first region R1 of the slot 13 close to the yoke 11. With this configuration, in the first region R1, the coils 3 are brought into close contact with each other (that is, contact areas between the coils 3 increase), and the coils 3 are pressed against the slot insulating portion 2.

Since the thermal conductivity of the coils 3 (metal) is higher than that of the resin portion 4, heat is more likely to be conducted when the individual coils 3 are brought into direct contact with each other, and the coils 3 and the slot insulating portion 2 are brought into direct contact with each other, as compared with when the coils 3 and the resin portion 4 are brought into contact with each other. Therefore, heat from the coils 3 is efficiently conducted to the stator core 10 through the slot insulating portion 2 by bringing the individual coils 3 into close contact with each other, and pressing the coils 3 against the slot insulating portion 2, in the first region R1.

In the second region R2 close to the teeth 12, the area ratio of the coils 3 is set second highest next to the first region R1. Thus, in the second region R2, the individual coils 3 are brought into close contact with each other, and the coils 3 are pressed against the slot insulating portion 2. As a result, heat from the coils 3 is efficiently conducted to the stator core 10 through the slot insulating portion 2.

Since the third region R3 is distant from both of the yoke 11 and the teeth 12, heat is less likely to be conducted the third region R3 to the stator core 10. Therefore, the are ratio of the coils 3 is set lowest in the third region R3 among the regions R1, R2, and R3 of the slot 13.

In this manner, when the areas A1, A2, and A3 of the regions R1, R2, and R3 of the slot 13 and the total cross-sectional areas S1, S2, and S3 of the coils 3 satisfy (S1/A1)>(S2/A2)>(S3/A3), heat generated by the coils 3 is efficiently dissipated. This makes it possible to enhance the output of the motor 100.

Since the bottom portion 13a of the slot 13 has a curved shape (for example, an arc shape), the bottom portion 13a has no corner portions unlike the case where the bottom portion 13a has a rectangular shape. Thus, a waste space is less likely to be formed between the coils 3 and the bottom portion 13a of the slot 13, and accordingly it is easy to densely arrange the coils 3 along the bottom portion 13a. Therefore, heat from the coils 3 is more likely to be conducted to the stator core 10 through the slot insulating portion 2, and the heat dissipation properties are further enhanced.

The width (that is, the length in circumferential direction) of the opening 14 of the slot 13 is uniform in this example. In other words, a figure formed by connecting the points P3, P4, P5, and P6 to each other is a square or an elongated rectangle. However, the opening 14 may have a non-uniform width as described later (see FIG. 11(A)).

Figure 7:
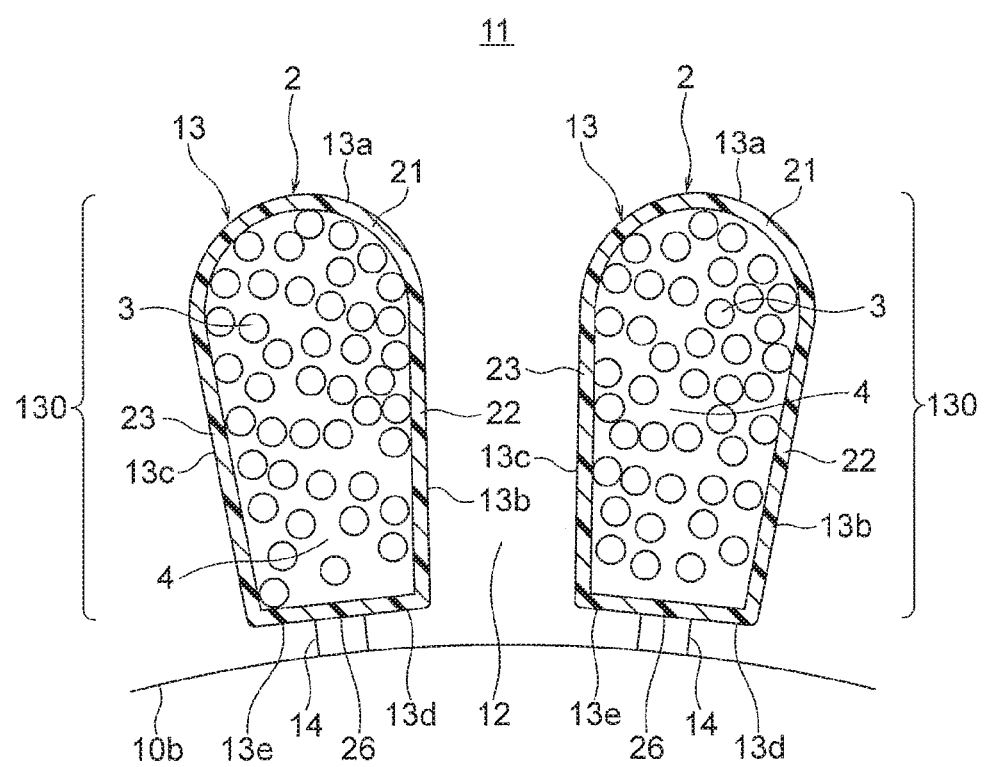
FIG. 7 is an enlarged sectional view illustrating a portion including slots of a stator according to a Comparative Example.

FIG. 7 is a view illustrating a portion including slots of a motor according to a Comparative Example. The slots 13, the slot insulating portions 2, and the resin portions 4 in the Comparative Example are similar to those in Embodiment 1 (FIG. 6). The Comparative Example is different from Embodiment 1 in that the coils 3 are evenly arranged in the coil housing portion 130 of each slot 13.

When the coils 3 are evenly arranged in the slot 13 as illustrated in FIG. 7, the individual coils 3 are less in direct contact with each other, and the coils 3 and the slot insulating portion 2 are also less in direct contact with each other. In other words, most of coils 3 are in contact with other coils 3 via the resin portion 4, or in contact with the slot insulating portion 2 via the resin portion 4.

Since the thermal conductivity of the resin portion 4 is lower than that of the coils 3, it is difficult to efficiently conduct heat from the coils 3 to the stator core 10 in the configuration of the Comparative Example in which the individual coils 3 are less in direct contact with each other, and the coils 3 and the slot insulating portion 2 are also less in direct contact with each other.

In contrast, in this Embodiment 1, the coils 3 are most densely arranged in the first region R1 (that is, the region closer to the yoke 11) of the slot 13, as illustrated in FIG. 5. Therefore, in the first region R1, the individual coils 3 are more in direct contact with each other, and the coils 3 and the slot insulating portion 2 are also more in direct contact with each other. Accordingly, heat is efficiently conducted from the coils 3 to the stator core 10 through the slot insulating portion 2, and the heat dissipation properties are enhanced.

The coils 3 are relatively densely arranged in the second region R2 (that is, the region closer to the tooth 12) of the slot 13. Therefore, even in the second region R2, the individual coils 3 are more in direct contact with each other, and the coils 3 and the slot insulating portion 2 are also more in direct contact with each other. Accordingly, heat 3 is efficiently conducted from the coils to the stator core 10 through the slot insulating portion 2, and the heat dissipation properties are enhanced.

(Thermal Conductivities of Resin Portion and Slot Insulating Portion)

The thermal conductivities of the resin portion 4 and the slot insulating portion 2 will be described below. The thermal conductivity of the coil 3 is expressed as $Q_c$, the thermal conductivity of the resin portion 4 filled in the slot 13 is expressed as $Q_r$, and the thermal conductivity of the slot insulating portion 2 is expressed as $Q_s$. The coil 3 is made of a metal (for example, copper), and the thermal conductivity of the coil 3 is higher than those of the resin portion 4 and the slot insulating portion 2. In other words, we have $Q_c > Q_r$ and $Q_c > Q_s$.

Since the resin portion 4 surrounds the coils 3 in the slot 13, the thermal conductivity $Q_r$ of the resin portion 4 is desirably equal to or higher than the thermal conductivity $Q_s$ of the slot insulating portion 2 in order to efficiently conduct heat from the coils 3 to the stator core 10. Thus, it is desirable to satisfy $Q_c > Q_r \geq Q_s$.

Figure 8:
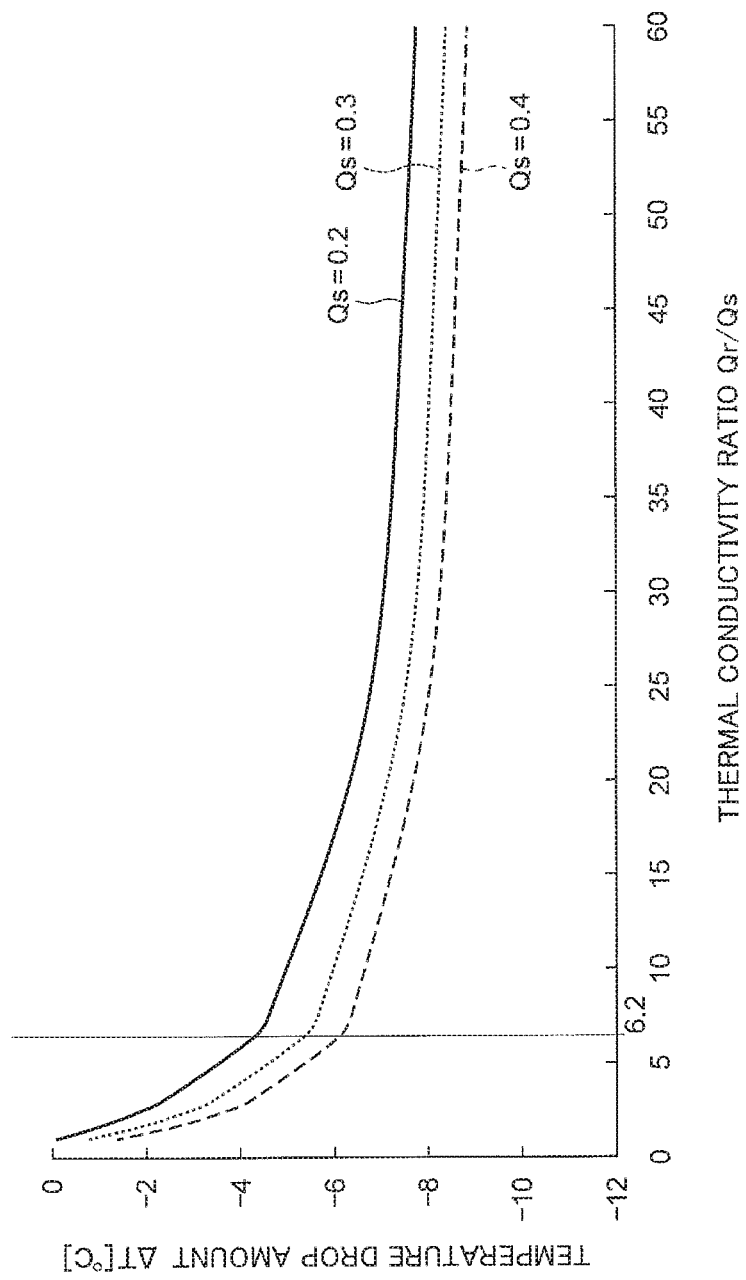
FIG. 8 is a graph showing a relationship between a ratio of a thermal conductivity of a resin portion in the slot to a thermal conductivity of a slot insulating portion, and a temperature drop amount.

FIG. 8 is a graph showing the relationship between the ratio $Q_r/Q_s$ of the thermal conductivity of the resin portion 4 to the thermal conductivity of the slot insulating portion 2, and the temperature drop amount $\Delta T$ (° C.) of the coils 3. In this example, the thermal conductivity $Q_s$ of the slot insulating portion 2 is set to 0.2, 0.3, and 0.4 W/(m·k) and the thermal conductivity $Q_r$ is changed in each case, and the temperature drop amount $\Delta T$ of the coils 3 is measured while applying current to the coils 3.

The temperature drop amount $\Delta T$ illustrated in FIG. 8 indicates the degrees by which the temperature of the coils 3 applied with current drops, with reference to the case where the thermal conductivity Qr of the resin portion 4 is equal to the thermal conductivity Qs of the slot insulating portion 2 (Qr=Qs).

The result illustrated in FIG. 8 indicates that the drop in temperature of the coils 3 is remarkable in the range of Qr/Qs≥6.2. The reason is considered to be as follows. Since the thermal conductivity Qr of the resin portion 4 is higher than the thermal conductivity Qs of the slot insulating portion 2, heat is efficiently conducted from one coil 3 to another coil 3 through the resin portion 4, and heat is also efficiently conducted from the coils 3 to the slot insulating portion 2. From above, satisfying Qc/Qs>Qr/Qs≥6.2 makes it possible to further enhance heat dissipation properties.

(Induction Motor)

The motor 100 according to Embodiment 1 is implemented as an induction motor, as described above. That is, a rotating magnetic field is generated by currents of the coils 3 of the stator 1, an induced current is generated in the squirrel-cage secondary conductor 6 of the rotor 5, and a torque is generated by the action of the induced current and the rotating magnetic field.

An induction motor is generally driven without using an inverter. In other words, a controller for the motor 100 generally drives the motor 100 by supplying a constant voltage to the coils 3. Therefore, fluctuations in load or supply voltage of the motor 100 may considerably increase the currents flowing through the coils 3, and this may lead to a rise in temperature of the coils 3.

The motor 100 according to this Embodiment 1 exhibits high heat dissipation properties as described above, and is capable of inhibiting the rise in temperature of the coils 3. Therefore, a significant effect is obtained especially for the induction motor. Although the motor 100 according to Embodiment 1 is implemented as the induction motor, the heat dissipation properties can also be obtained to a certain extent even when the motor 100 is implemented as a synchronous motor.

(Manufacturing Process of Stator 1)

Figure 9:
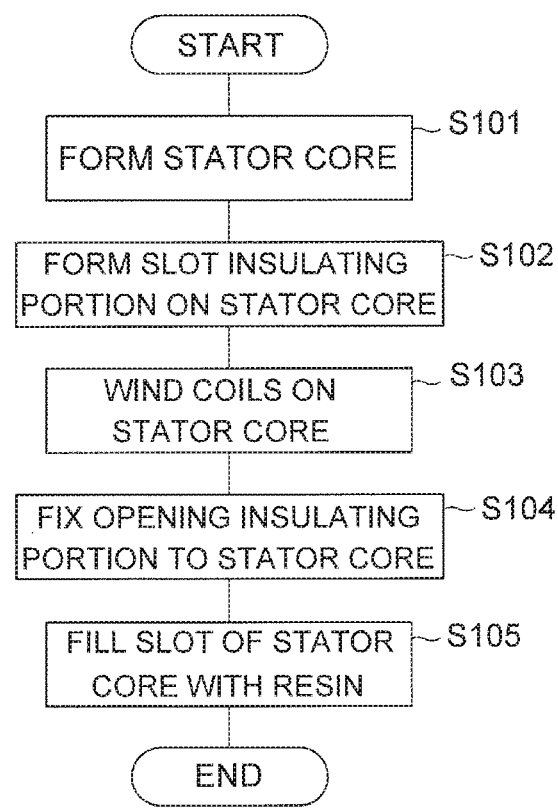
FIG. 9 is a flowchart illustrating a manufacturing process of the stator according to Embodiment 1.

The manufacturing process of the stator 1 will be described below. FIG. 9 is a flowchart for explaining the manufacturing process of the stator 1. First, electrical steel sheets are formed into the shape (see FIG. 3) of the stator core 10 having the slots 13 one sheet by one sheet by punching. Then, a plurality of punched electrical steel sheets are stacked in the axial direction and fastened together by crimping or the like (step S101).

Then, the slot insulating portion 2 is formed to cover the inner surface of the coil housing portion 130 of each slot 13 in the stator core 10 (step S102). The slot insulating portions 2 are obtained by integrally molding a resin and the stator core 10, or fitting a resin compact molded in advance on the stator core 10.

Then, the coils 3 are wound around the teeth 12 of the stator core 10 (step S103). The coils 3 wound around the teeth 12 are housed in the slots 13. At this stage, the coils 3 are evenly distributed in the coil housing portion 130 of each slot 13.

Then, the opening insulating portion 26 made of, for example, a film-like PET is mounted between the coil housing portion 130 and the opening 14 of each slot 13 (step S104). This prevents the coils 3 from falling off the slots 13.

Then, the resin portion 4 is formed in each slot 13 by filling each slot 13 with a resin such as PBT (step S105). At this stage, the resin portion 4 is filled in the slot 13 from the center portion of the third region R3, for example, and thus the coils 3 evenly distributed in the slot 13 are moved outward in the radial direction (that is, toward the bottom portion 13a), and toward both sides of the slot 13 in the circumferential direction (that is, toward the first side portion 13b and the second side portion 13c).

Therefore, the coils 3 are arranged at a highest density in the first region R1 of the slot 13, arranged at a relatively high density in the second region R2 of the slot 13, and arranged at a low density in the third region R3 of the slot 13. In other words, the area ratio of the coils 3 in the slot 13 is highest in the first region R1, second highest in the second region R2, and lowest in the third region R3.

The stator 1 including the stator core 10, the slot insulating portions 2, the coils 3, and the resin portions 4 is thus completed. By inserting the rotor 5 (FIGS. 2(A) and 2(B)) inside the stator 1, the motor 100 as illustrated in FIG. 1 is completed.

(Effects of Embodiment 1)

As described above, in Embodiment 1 of the present invention, each slot 13 of the stator 1 includes the first region R1 closer to the yoke 11, the second region R2 closer to the tooth 12, and the third region R3 other than the regions R1 and R2, and the areas A1, A2, and A3 of the regions R1, R2, and R3 and the total cross-sectional areas S1, S2, and S3 of the coils 3 satisfy (S1/A1)>(S2/A2)>(S3/A3). With this configuration, heat generated by the coils 3 is more likely to be conducted to the stator core 10, and thus heat dissipation properties can be enhanced, and the rise in temperature of the coils 3 can be inhibited.

With the enhancement in heat dissipation properties of the motor 100, large amount of currents can be supplied to the coils 3, and thus output of the motor 100 can be enhanced.

Since the slot insulating portion 2 for insulating the coils 3 and the stator core 10 from each other is formed in each slot 13, the coils 3 do not come into direct contact with end edges of the electrical steel sheets even when the coils 3 are pressed toward the inner surface of the slot 13 by the resin portion 4. Thus, damage to the coils 3 can be prevented.

Since the thermal conductivity Qr of the resin portion 4 filled in the slot 13 is equal to or higher than the thermal conductivity Qs of the slot insulating portion 2, heat can be efficiently conducted from one coil 3 to another coil 3 or from the coils 3 to the slot insulating portion 2 through the resin portion 4.

In particular, satisfying Qc/Qs>Qr/Qs≥6.2 makes it possible to more efficiently conduct heat generated by the coils 3 to the stator core 10.

The opening insulating portion 26 is provided between the coil housing portion 130 and the opening 14 of each slot 13, and thus the coils 3 can be prevented from falling off the slot 13.

Since the bottom portion 13a of each slot 13 has an arc shape, the coils 3 can be easily arranged along the bottom portion 13a of the slot 13. Therefore, heat is more likely to be conducted from the coils 3 to the stator core 10 through the slot insulating portion 2, and thus the heat dissipation properties can be further enhanced.

Since each slot 13 includes the first facing portion 13d extending from the first side portion 13b to the third point P3, and the second facing portion 13e extending from the second side portion 13c to the fourth point P4, the second region R2 can be ensured on both sides of the straight lines L2 and L3.

Since the side portions 13b and 13c of each slot 13 extend so that the distance therebetween increases outward in the radial direction, the ratio of the area of the first region R1 to that of the slot 13 can be made large. This makes it possible to increase the number of coils 3 arranged in the first region R1, and to further enhance the heat dissipation properties.

Since the motor 100 according to this Embodiment 1 has high heat dissipation properties, a particularly significant effect can be obtained by applying the motor 100 to an induction motor generally driven without using an inverter.

In the manufacturing process of the stator 1, the stator core 10 is prepared (step S101), the coils 3 are inserted into the slots 13 (step S103), and the slots 13 are filled with a resin to form the resin portions 4 (step S105). The slots 13 are filled with the resin so that the resin causes the coils 3 to move outward in the radial direction (that is, toward the first region R1) in each slot 13, and toward both sides of the slot 13 in the circumferential direction (that is, toward the second region R2). It is, therefore, possible to easily achieve a configuration in which the area ratio of the coils 3 is highest in the first region R1 of the slot 13, and second highest in the second region R2 of the slot 13.

Modification.

Figure 10:
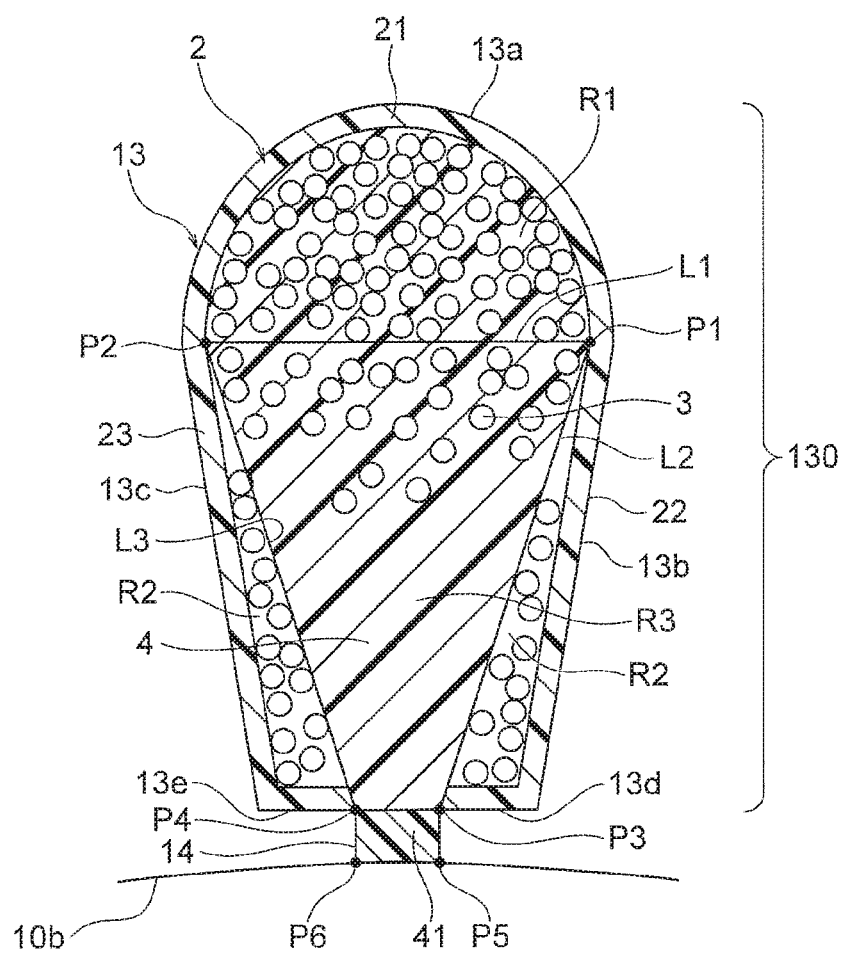
FIG. 10 is an enlarged sectional view illustrating a portion including a slot of a stator according to a Modification to Embodiment 1.

FIG. 10 is an enlarged view illustrating a portion including a slot 13 of a stator according to a Modification of Embodiment 1. In the above-described Embodiment 1, the opening 14 of the slot 13 is filled with no resin and forms a hollow portion (see FIG. 5). In contrast, in the Modification, the opening 14 is filled with a resin portion 41 as a second resin portion.

In the Modification, no opening insulating portion 26 (FIG. 5) is provided between the coil housing portion 130 and the opening 14 of the slot 13. This is because the resin portion 41 of the opening 14 prevents the coils 3 from falling and thus it is unnecessary to provide the opening insulating portion 26. In other words, the resin portion 41 (second resin portion) in the opening 14 and the resin portion 4 (first resin portion) in the coil housing portion 130 are in contact with each other.

The resin portion 41 is desirably made of the same resin (for example, PBT) as that of the resin portion 4. With this configuration, the resin portion 41 of the opening 14 can be formed integrally with the resin portion 4, and the manufacturing process of the stator 1 can be simplified. The resin portion 41, however, may made of a resin different from that of the resin portion 4.

In the manufacturing process of the stator according to the Modification, the mounting process (step S104) of the opening insulating portion 26 in the manufacturing process (FIG. 9) described in Embodiment 1 is omitted. Instead, the opening 14 is filled with the resin portion 41 concurrently with the filling process with the resin portions 4 (step S105).

In the Modification, since the opening 14 is filled with the resin portion 41, heat generated by the coils 3 can be conducted to the stator core 10 through the resin portion 41 in the opening 14. As a result, the heat dissipation properties can be further enhanced. Since the opening insulating portion 26 (FIG. 5) is unnecessary, the manufacturing cost of the stator 1 can be reduced.

Embodiment 2

Figure 11A:
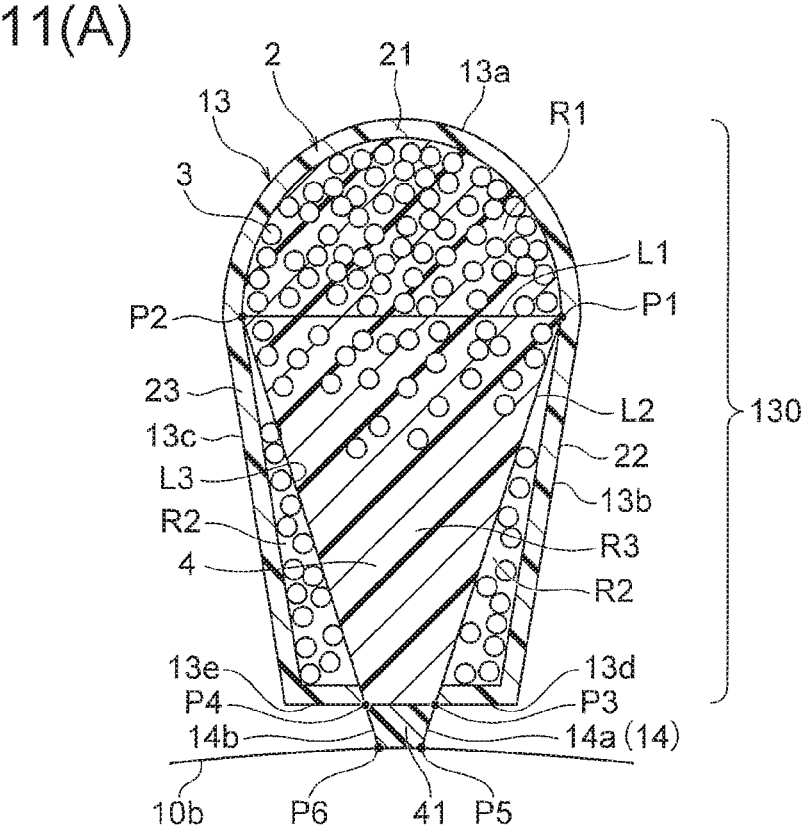
FIG. 11(A) is an enlarged sectional view illustrating a portion including a slot of a stator according to Embodiment 2.

FIG. 11(A) is an enlarged view illustrating a portion including a slot 13 of a stator according to Embodiment 2. In the above-described Embodiment 1, the width (that is, the dimension in the circumferential direction) of the opening 14 of the slot 13 is uniform (see FIG. 5). In contrast, in Embodiment 2, the width of an opening 14 of the slot 13 increases outward in the radial direction. The opening 14 is filled with a resin portion 41.

Figure 11B:
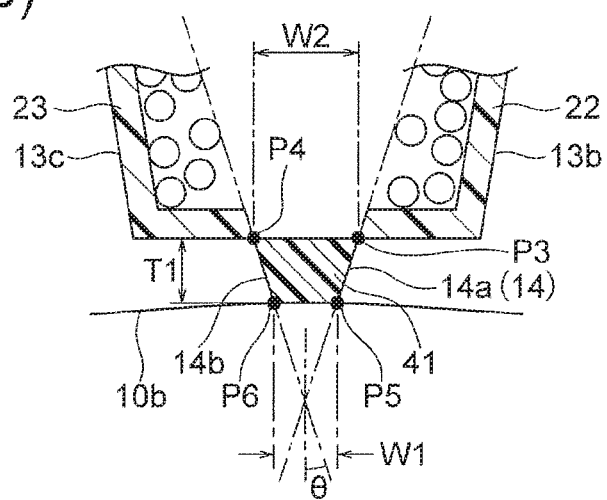
FIG. 11(B) is an enlarged sectional view illustrating a shape of an opening of the slot.

FIG. 11(B) is a view illustrating the shape of the opening 14. As described in Embodiment 1, the opening 14 has two ends in the circumferential direction at a portion connecting to the coil housing portion 130. Of the two ends, the end on the same side as the point P1 corresponds to the point P3, and the end on the same side as the point P2 corresponds to the point P4. The opening 14 has two ends in the circumferential direction at a portion connecting to the inner circumference 10b. Of the two ends, the end on the same side as the point P3 corresponds to the point P5, and the end on the same side as the point P4 corresponds to the point P6.

The opening 14 forms a trapezoidal portion surrounded by the points P3, P4, P5, and P6. The opening 14 has a side portion 14a defined by a line connecting the third point P3 to the fifth point P5, and another side portion 14b defined by a line connecting the fourth point P4 to the sixth point P6. The minimum width of the opening 14 is defined by an interval W1 between the fifth point P5 and the sixth point P6, and the maximum width of the opening 14 is defined by an interval W2 between the third point P3 and the fourth point P4.

The opening 14 allows the coils 3 to pass when the coils 3 are wound around the teeth 12, as described above. In order to allow the coils 3 to pass smoothly, the interval W1 (that is, the minimum width of the opening 14) is desirably equal to or wider than 1.5 times the diameter (wire diameter) D of the coil 3 (W1≥1.5×D).

The length of the opening 14 in the radial direction is represented by T1. A half of an angle formed between the side portions 14a and 14b of the opening 14 (that is, both end edges of the opening 14 in the circumferential direction) is defined as an opening angle θ (°). Using the intervals W1 and W2 and the distance T1, the opening angle θ is expressed as follows:

$$\theta = (180/\pi) \times \tan^{-1}((W2-W1)/(2 \times T1))$$

In this regard, (180/π) on the right side is used to convert a unit from radians into degrees (°).

When the interval W2 of the opening 14 is narrower than the interval W1 of the opening 14, it is difficult to fill the opening 14 with a resin from the regions R1-R3 side of the slot 13. Thus, it is desirable that the interval W2 is wider than the interval W1 (that is, the opening angle θ is larger than zero).

As the minimum width of the opening 14 is narrower, characteristics of the motor 100 (more specifically, flow of magnetic flux through the stator core 10) are enhanced. Therefore, by making the interval W2 of the opening 14 wide while making the interval W1 of the opening 14 narrow, it is possible to enhance the characteristics of the motor 100, facilitate filling the opening 14 with a resin, and enhance the heat dissipation properties.

Figure 12:
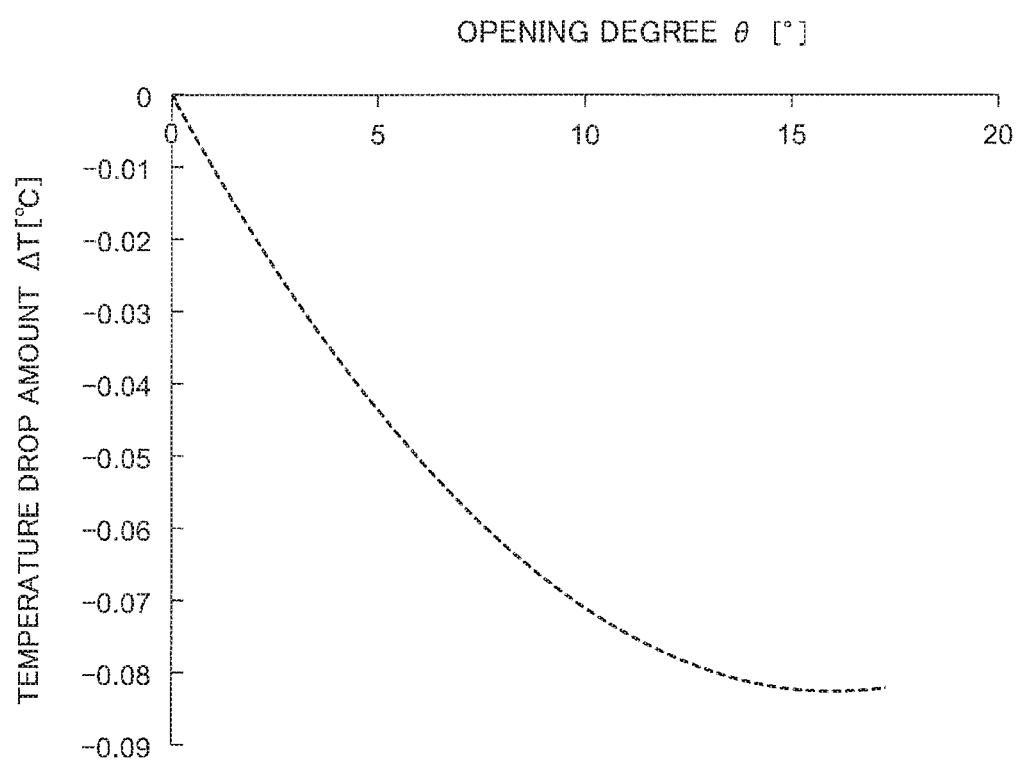
FIG. 12 is a graph showing a relationship between an opening angle of the opening and a temperature drop amount of the coils.

FIG. 12 is a graph showing the relationship between the opening angle θ (°) of the opening 14 and the temperature drop amount ΔT (° C.) of the coils 3. As the opening angle θ increases, the temperature drop amount ΔT of the coils 3 increases as illustrated in FIG. 12. When the opening angle θ approaches 15°, the change in temperature drop amount ΔT levels off.

Therefore, it is desirable that the opening angle θ is larger than zero and smaller than or equal to 15° (that is, 0<θ≤15°). Other features of the configuration of the stator 1 and the configuration of the structure of the rotor 5 are the same as those in Embodiment 1.

As described above, in Embodiment 2 of the present invention, the width (the dimension in the circumferential direction) of the opening 14 of the slot 13 increases outward in the radial direction, and the opening 14 is filled with the resin portion 41. Thus, it is possible to facilitate filling of the opening 14 with the resin while ensuring the characteristics of the motor 100, and to further enhance the heat dissipation properties.

By making the opening angle θ of the opening 14 with respect to the radial direction in the range of 0<θ≦15°, the heat dissipation properties can be further enhanced.

In the Embodiment 2, the opening 14 may be made as a hollow portion without the resin portion 41, and the opening insulating portion 26 may be provided. The effect of improving the heat dissipation properties, however, is greater when the resin portion 41 is provided in the opening 14.

(Scroll Compressor)

Figure 13:
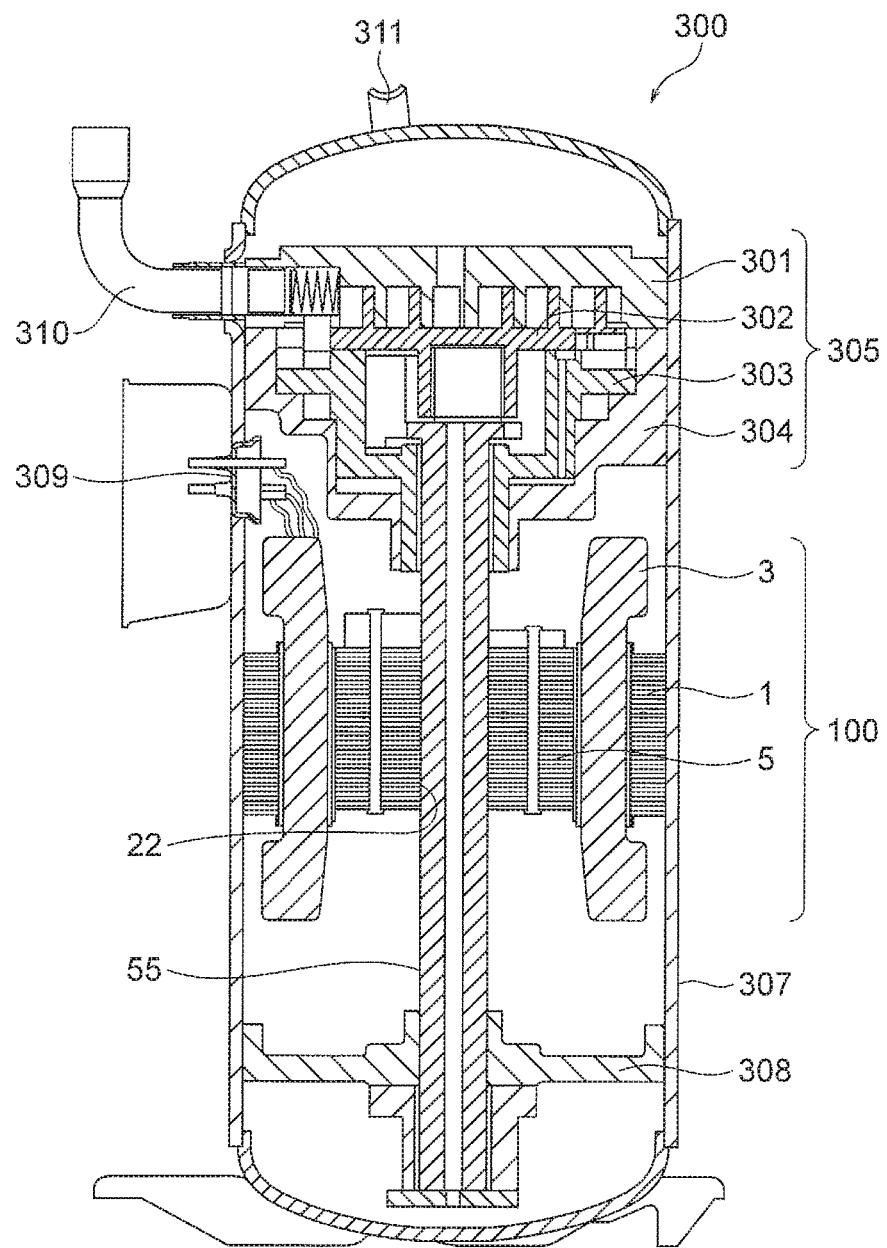
FIG. 13 is a view illustrating a compressor to which the motor according to each of the Embodiments and Modification is applicable.

A scroll compressor 300 will be described below as a compressor to which the motor 100 according to each of the Embodiments and the Modification is applicable. FIG. 13 is a sectional view illustrating the scroll compressor 300. The scroll compressor 300 includes a closed container 307, a compression mechanism 305 disposed in the closed container 307, the motor 100 for driving the compression mechanism 305, a shaft 55 connecting the compression mechanism 305 to the motor 100, and a sub-frame 308 supporting a lower end (that is, an end opposite to the compression mechanism 305) of the shaft 55.

The compression mechanism 305 includes a fixed scroll 301 having a spiral portion, an orbiting scroll 302 having a spiral portion coupled with the spiral portion of the fixed scroll 301 to form a compression chamber, a compliance frame 303 holding an upper end of the shaft 55, and a guide frame 304 fixed to the closed container 307 and holding the compliance frame 303.

A suction pipe 310 passing through the closed container 307 is press-fitted to the fixed scroll 301. The closed container 307 is provided with a discharge pipe 311 for discharging high-pressure refrigerant gas discharged from the fixed scroll 301 to the exterior. The discharge pipe 311 communicates with an opening (not illustrated) provided between the compression mechanism 305 and the motor 100 in the closed container 307.

The motor 100 is fixed to the closed container 307 by fitting the stator 1 into the closed container 307. The configuration of the motor 100 is as described above. A glass terminal 309 for supplying power to the motor 100 is fixed to the closed container 307 by welding.

When the motor 100 rotates, the rotation of the motor 100 is transmitted to the orbiting scroll 302, and the orbiting scroll 302 swings. When the orbiting scroll 302 swings, a volume of the compression chamber formed between the spiral portion of the orbiting scroll 302 and the spiral portion of the fixed scroll 301 changes. Refrigerant gas is sucked through the suction pipe 310, compressed, and discharged through the discharge pipe 311.

During rotation of the motor 100, currents flow through the coils 3 and heat is generated. The heat generated by the coils 3 is conducted to the stator core 10 through the resin portions 4 and the slot insulating portions 2 (FIG. 5), and dissipated from the stator core 10 to the closed container 307. Since the motor 100 according to each of the Embodiments and the Modification has high heat dissipation properties, the rise in temperature inside the scroll compressor 300 can be inhibited. With the enhancement in output of the motor 100, the output of the scroll compressor 300 can also be enhanced.

Although the scroll compressor 300 is described as an example of a compressor herein, the motor described in each of the Embodiments and the Modification may also be applied to compressors other than the scroll compressor 300.

(Air Conditioning Apparatus)

Figure 14:
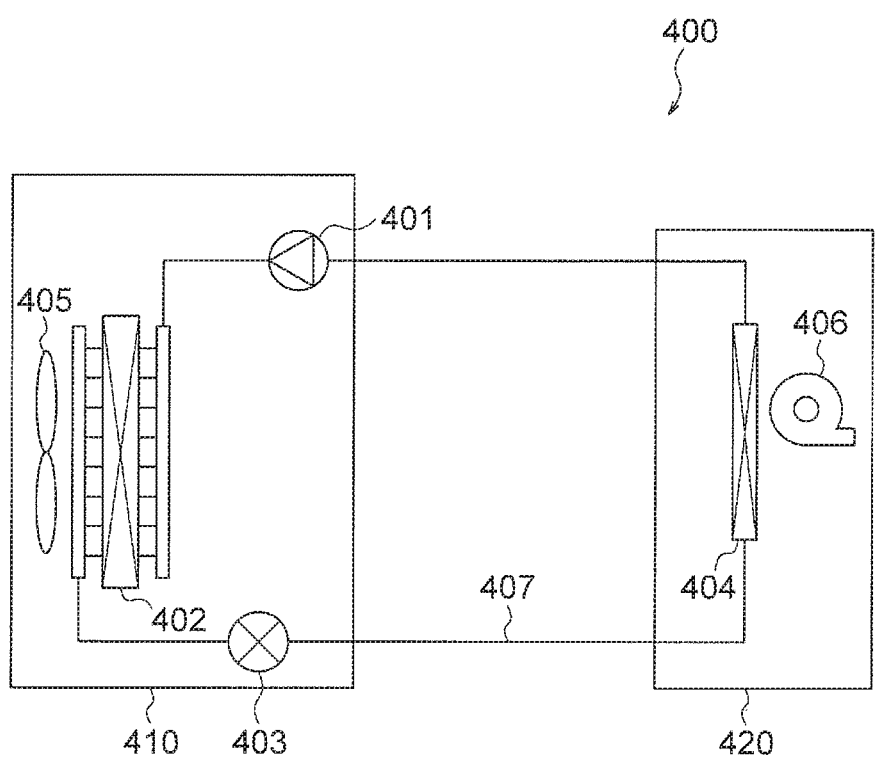
FIG. 14 is a diagram illustrating an air conditioning apparatus including the compressor illustrated in FIG. 13.

An air conditioning apparatus to which the motor according to each of the above-described Embodiments is applicable will be described below. FIG. 14 is a diagram illustrating an air conditioning apparatus 400 (refrigeration cycle apparatus). The air conditioning apparatus 400 includes a compressor 401, a condenser 402, a throttling device (decompressor) 403, and an evaporator 404. The compressor 401, the condenser 402, the throttling device 403, and the evaporator 404 are connected to each other via a refrigerant pipe 407 to form a refrigeration cycle. In other words, refrigerant circulates through the compressor 401, the condenser 402, the throttling device 403, and the evaporator 404 in this order.

The compressor 401, the condenser 402, and the expansion valve 403 are provided in an outdoor unit 410. The compressor 401 is constituted by the scroll compressor 300 illustrated in FIG. 13. An outdoor fan 405 for supplying outdoor air to the condenser 402 is provided in the outdoor unit 410. The evaporator 404 is provided in an indoor unit 420. An indoor fan 406 for supplying indoor air to the evaporator 404 is provided in the indoor unit 420.

An operation of the air conditioner 400 is as follows. The compressor 401 compresses sucked refrigerant and sends out the compressed refrigerant. The condenser 402 exchanges heat between the refrigerant flowing from the compressor 401 and the outdoor air, condenses and liquefies the refrigerant, and sends out the liquefied refrigerant to the refrigerant pipe 407. The outdoor fan 405 supplies the outdoor air to the condenser 402. The throttle device 403 changes its opening degree to thereby adjust a pressure or the like of the refrigerant flowing through the refrigerant pipe 407.

The evaporator 404 exchanges heat between the refrigerant brought into a low pressure state by the throttle device 403 and the indoor air, causes the refrigerant to take heat from the air and evaporate (vaporize), and sends out the refrigerant to the refrigerant pipe 407. The indoor fan 406 supplies the indoor air to the evaporator 404. Thus, cool wind deprived of heat at the evaporator 404 is supplied into a room.

As described above, since the motor 100 according to each of the Embodiments and the Modification has high heat dissipation properties, the rise in temperature inside the compressor 401 can be inhibited, and a stable operation of the air conditioning apparatus 400 can thus be achieved. With the enhancement in output of the motor 100, the output of the compressor 401 is enhanced, and thus the output of the air conditioning apparatus 400 can be enhanced.

While desirable embodiments of the present invention have been described in detail above, the present invention is not limited thereto, and various improvements or modifications may be made without departing from the gist of the present invention.

What is claimed is:

1. A stator comprising:
   a stator core having an inner circumference extending in a circumferential direction about an axis, and a slot located outside the inner circumference in a radial direction about the axis;
   coils disposed in the slot; and
   a resin portion surrounding the coils in the slot,
   wherein the slot has an opening connecting to the inner circumference, and a coil housing portion formed outside the opening in the radial direction and housing the coils;

wherein the coil housing portion comprises:
a first side portion and a second side portion facing each other in the circumferential direction; and
a bottom portion having a curved shape and located outside the first side portion and the second side portion in the radial direction;
wherein in a plane perpendicular to the axis, a boundary between the bottom portion and the first side portion is defined as a first point, a boundary between the bottom portion and the second side portion is defined as a second point, a point on the opening closest to the first side portion is defined as a third point, and a point on the opening closest to the second side portion is defined as a fourth point;
wherein a straight line connecting the first point to the second point is defined as a first straight line;
wherein a straight line connecting the first point to the third point is defined as a second straight line;
wherein a straight line connecting the second point to the fourth point is defined as a third straight line;
wherein a region surrounded by the first straight line and the bottom portion is defined as a first region;
wherein a combination of a region surrounded by the second straight line and the first side portion, and a region surrounded by the third straight line and the second side portion is defined as a second region;
wherein a region surrounded by the first straight line, the second straight line, and the third straight line in the coil housing portion is defined as a third region; and
wherein an area A1 of the first region, a total cross-sectional area S1 of the coils in the first region, an area A2 of the second region, a total cross-sectional area S2 of the coils in the second region, an area A3 of the third region, and a total cross-sectional area S3 of the coils in the third region satisfy:

$(S1/A1)>(S2/A2)>(S3/A3)$.

2. The stator according to claim 1, further comprising a slot insulating portion provided in the slot and insulating the coils and the stator core from each other,
wherein the first point corresponds to a point located at a boundary between the bottom portion and the first side portion on an inner surface of the slot insulating portion;
wherein the second point corresponds to a point located at a boundary between the bottom portion and the second side portion on the inner surface of the slot insulating portion;
wherein the first region corresponds to a region surrounded by the first straight line and the inner surface of the slot insulating portion on the bottom portion; and
wherein the second region corresponds to a combination of a region surrounded by the second straight line and the inner surface of the slot insulating portion on the first side portion, and a region surrounded by the third straight line and the inner surface of the slot insulating portion on the second side portion.

3. The stator according to claim 2, wherein a thermal conductivity Qr of the resin portion is equal to or higher than a thermal conductivity Qs of the slot insulating portion.

4. The stator according to claim 3, wherein the thermal conductivity Qr of the resin portion and the thermal conductivity Qs of the slot insulating portion satisfy:

$Qr/Qs \geq 6.2$.

5. The stator according to claim 1, further comprising an opening insulating portion having insulation properties and disposed at a boundary between the coil housing portion and the opening of the slot.

6. The stator according to claim 2, wherein the resin portion comprises a first resin portion;
wherein a second resin portion is disposed in the opening; and
wherein the first resin portion and the second resin portion are in contact with each other.

7. The stator according to claim 6, wherein the first resin portion and the second resin portion are formed by the same resin.

8. The stator according to claim 1, wherein the opening comprises a hollow portion.

9. The stator according to claim 1, wherein a width W1 of the opening in the circumferential direction on an inner edge of the opening in the radial direction is narrower than a width W2 of the opening in the circumferential direction on an outer edge of the opening in the radial direction.

10. The stator according to claim 9, wherein the width W1 of the opening is equal to or wider than 1.5 times a wire diameter of the coils.

11. The stator according to claim 9, wherein when T1 represents a length of the opening in the radial direction, and θ (°) represents a half of an angle formed between two end edges of the opening in the circumferential direction, $\theta=(180/\pi) \times \tan^{-1}((W2-W1)/(2 \times T1))<15$ is satisfied.

12. The stator according to claim 1, wherein the bottom portion has an arc shape.

13. The stator according to claim 1, wherein the slot comprises a first facing portion extending from the first side portion to the third point, and a second facing portion extending from the second side portion to the fourth point, and
wherein the first facing portion and the second facing portion face the bottom portion.

14. The stator according to claim 1, wherein a distance between the first side portion and the second side portion of the slot increases outward in the radial direction.

15. A motor comprising:
the stator according to claim 1; and
a rotor rotatably provided inside the stator in the radial direction.

16. The motor according to claim 15, wherein the motor comprises an induction motor.

17. A compressor comprising:
a closed container;
a compression mechanism disposed in the closed container; and
the motor according to claim 15, the motor driving the compression mechanism.

18. An air conditioning apparatus comprising the compressor according to claim 17, a condenser, a decompressor, and an evaporator.

* * * * *